(12) United States Patent
Steinberg

(10) Patent No.: US 6,873,743 B2
(45) Date of Patent: Mar. 29, 2005

(54) METHOD AND APPARATUS FOR THE AUTOMATIC REAL-TIME DETECTION AND CORRECTION OF RED-EYE DEFECTS IN BATCHES OF DIGITAL IMAGES OR IN HANDHELD APPLIANCES

(75) Inventor: Eran Steinberg, San Francisco, CA (US)

(73) Assignee: Fotonation Holdings, LLC, Peterborough, NH (US)

( * ) Notice: Subject to any disclaimer, the term of this patent is extended or adjusted under 35 U.S.C. 154(b) by 534 days.

(21) Appl. No.: 10/113,871

(22) Filed: Mar. 29, 2002

(65) Prior Publication Data

US 2002/0176623 A1 Nov. 28, 2002

Related U.S. Application Data

(63) Continuation-in-part of application No. 09/823,139, filed on Mar. 29, 2001, now Pat. No. 6,751,348.

(51) Int. Cl.[7] ............................. G06K 9/40; G06K 9/00
(52) U.S. Cl. ..................................... 382/275; 382/117
(58) Field of Search ............................... 382/115, 117, 382/162, 164, 165, 167, 168, 171, 172, 199, 278, 274–277; 358/518, 520, 522; 348/207, 239, 370, 576

(56) References Cited

U.S. PATENT DOCUMENTS

| | | | |
|---|---|---|---|
| 5,177,694 A | 1/1993 | Graham et al. | 364/526 |
| 5,218,555 A | 6/1993 | Komai et al. | 364/526 |
| 5,329,596 A | 7/1994 | Sakou et al. | 382/37 |
| 5,432,863 A * | 7/1995 | Benati et al. | 382/167 |
| 5,488,429 A | 1/1996 | Kojima et al. | 348/653 |
| 5,633,952 A | 5/1997 | Outa et al. | 382/165 |
| 5,638,136 A | 6/1997 | Kojima et al. | 348/653 |
| 5,678,041 A | 10/1997 | Baker et al. | 395/609 |
| 5,748,764 A * | 5/1998 | Benati et al. | 382/117 |
| 5,754,676 A | 5/1998 | Komiya et al. | 382/132 |
| 5,765,029 A | 6/1998 | Schweid et al. | 395/61 |

(List continued on next page.)

FOREIGN PATENT DOCUMENTS

| | | | | |
|---|---|---|---|---|
| EP | 1/126508 | 2/2001 | | H01L/21/00 |
| JP | 09237348 A | 9/1997 | | G06T/7/60 |
| WO | WO00/67204 | 11/2000 | | G06T/7/00 |

OTHER PUBLICATIONS

Forsyth, David A. et al., "Finding Naked People," Journal Review, 1996.

Forsyth, David A. et al., "Finding Pictures of Objects in Large Collections of Images," Proceedings, International Workshop on Object Recognition, Cambridge, 1996.

Flich, Margaret, et al., "Finding Naked People," Proceedings of 4th European Conference on Computer Vision, 1996.

*Primary Examiner*—Andrew W. Johns
*Assistant Examiner*—Amir Alavi
(74) *Attorney, Agent, or Firm*—Sawyer Law Group LLP

(57) ABSTRACT

An automatic, red-eye detection and correction system for digital images capable of real-time processing of images, including a red-eye detector module that determines without user intervention if a red-eye defect exists. If a defect is located in an image the portion of the image surrounding the defect is passed to a correction module that de-saturates the red components of the defect while preserving the other color characteristics of the defect region. The invention is designed to minimize the computational resources required to detect and correct red-eye defects and thus is particularly suited to applications requiring real-time processing of large volumes of digital images prior to acquisition or printing. This system can operate on images stored on personal computers, commercial printers or inside digital cameras as part of the acquisition process, or prior to display on personal digital assistants, mobile phones and other digital imaging appliances.

27 Claims, 15 Drawing Sheets

U.S. PATENT DOCUMENTS

| | | | |
|---|---|---|---|
| 5,771,307 A | 6/1998 | Lu et al. | 382/116 |
| 5,778,156 A | 7/1998 | Schweid et al. | 396/61 |
| 5,796,869 A | 8/1998 | Tsuji et al. | 382/203 |
| 5,805,730 A | 9/1998 | Yaeger et al. | 382/228 |
| 5,813,542 A | 9/1998 | Cohn | 209/581 |
| 5,828,779 A | 10/1998 | Maggioni | 382/165 |
| 5,832,212 A | 11/1998 | Cragun et al. | 395/188.01 |
| 5,835,722 A | 11/1998 | Humes | 395/200.55 |
| 5,852,823 A | 12/1998 | De Bonet | 707/6 |
| RE36,041 E | 1/1999 | Turk et al. | 382/118 |
| 5,857,014 A | 1/1999 | Sumner et al. | 379/93.02 |
| 5,872,859 A | 2/1999 | Gur et al. | 382/128 |
| 5,911,043 A | 6/1999 | Duffy et al. | 395/200.33 |
| 5,937,404 A | 8/1999 | Csaszar et al. | 707/9 |
| 5,949,904 A | 9/1999 | Delp | 382/185 |
| 6,009,209 A * | 12/1999 | Acker et al. | 382/275 |
| 6,016,354 A * | 1/2000 | Lin et al. | 382/117 |
| 6,041,133 A | 3/2000 | Califano et al. | 382/124 |
| 6,049,821 A | 4/2000 | Theriault et al. | 709/203 |
| 6,065,055 A | 5/2000 | Hughes et al. | 709/229 |
| 6,065,056 A | 5/2000 | Bradshaw et al. | 709/229 |
| 6,067,339 A | 5/2000 | Berger | 386/48 |
| 6,115,495 A | 9/2000 | Tachikawa et al. | 382/165 |
| 6,122,400 A | 9/2000 | Reitmeier | 382/168 |
| 6,128,397 A | 10/2000 | Baluja et al. | 382/118 |
| 6,134,339 A * | 10/2000 | Luo | 382/115 |
| 6,148,092 A | 11/2000 | Qian et al. | 382/118 |
| 6,182,081 B1 | 1/2001 | Dietl et al. | 707/102 |
| 6,204,858 B1 * | 3/2001 | Gupta | 345/600 |
| 6,252,976 B1 * | 6/2001 | Schildkraut et al. | 382/117 |
| 6,259,801 B1 | 7/2001 | Wakasu | 382/100 |
| 6,266,664 B1 | 7/2001 | Russell-Falla et al. | 707/5 |
| 6,278,491 B1 * | 8/2001 | Wang et al. | 348/370 |
| 6,286,001 B1 | 9/2001 | Walker et al. | 707/9 |
| 6,407,777 B1 | 6/2002 | DeLuca | 348/576 |
| 6,631,208 B1 * | 10/2003 | Kinjo et al. | 382/167 |
| 6,798,903 B2 * | 9/2004 | Takaoka | 382/167 |
| 2001/0002931 A1 | 6/2001 | Maes | 382/100 |
| 2002/0126893 A1 | 9/2002 | Held et al. | 382/167 |
| 2002/0138450 A1 | 9/2002 | Chen et al. | 382/165 |

* cited by examiner

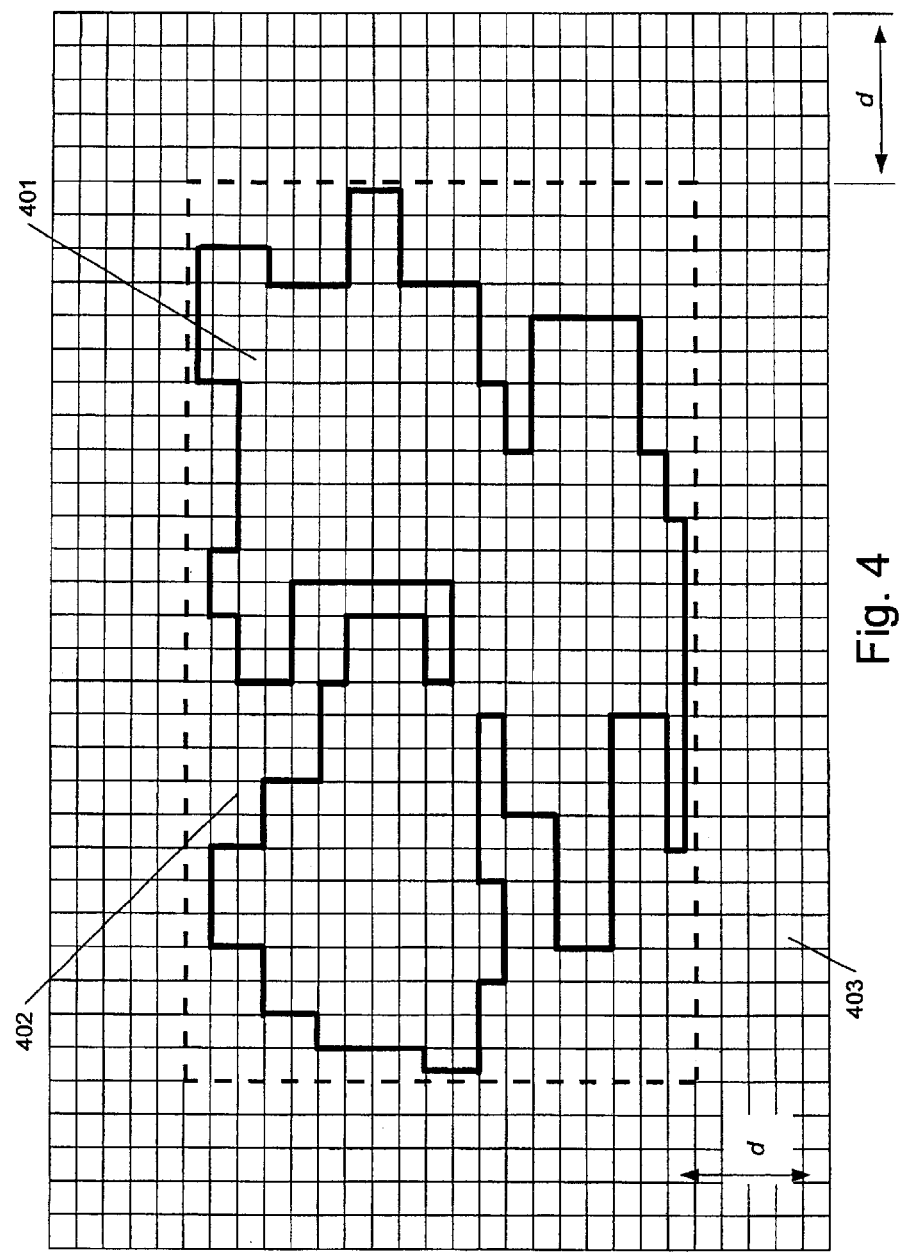

METHOD AND APPARATUS FOR THE AUTOMATIC REAL-TIME DETECTION AND CORRECTION OF RED-EYE DEFECTS IN BATCHES OF DIGITAL IMAGES OR IN HANDHELD APPLIANCES

CROSS REFERENCE TO RELATED APPLICATIONS

This application is a continuation-in-part of Ser. No. 09/823,139 now U.S. Pat. No. 6,751,348 B2 Filed Mar. 29, 2001 titled "Automated Detection of Pornographic Images".

FIELD OF THE INVENTION

The present invention relates to digital image processing, and more particularly to a method and apparatus for detecting and correcting red-eye defects in a digital image thereby reducing or eliminating the need for user intervention.

BRIEF DESCRIPTION OF THE PRIOR ART

As is well known, photographing a person in a relatively dark environment requires the use of a photographic flash to avoid under-exposure. However, a known artifact of such images is the appearance of a strong red circle instead of the eyes, also termed as "red-eye". There are three main reasons for this artifact: 1) the proximity of the flash bulb to the lens; 2) the fact that if flash was needed, most likely the light was dim, and therefore the pupils of the eyes are naturally dilated. In addition, the physiology and anatomy of the eye, as illustrated in FIG. 1 plays an important role. 3) The fact that the eyes include a transparent lens 100 and medium 102 (Vitreous humor), and therefore light can penetrate and be reflected easily. Moreover, in the case of a light color iris 104, such as blue or green eyes, the red-eye effect, because of the transparent nature of light iris, is even more exaggerated than merely on the pupil 106, and manifest itself on the whole Iris 104. Physiologically, as the amount of light entering the eye diminishes, such as in a dark room or at night, the iris dilator muscle, which runs radially through the iris like spokes on a wheel, pulls away from the center, causing the pupil to "dilate" and allowing more light to reach the retina. When too much light is entering the eye, the iris sphincter muscle, which encircles the pupil, pulls toward the center, causing the pupil to "constrict", allowing less light to reach the retina.

Red-eye effect happens when the internal blood vessels of the eye located inside the eyeball in the retina region or the middle or vascular tunic retro-reflect their red color. This is probably the most common defect in pictures processed from amateur and consumer photography. Redeye is a less noticeable artifact for professional photographers who usually implement a lighting system where the lens and the flash are distant to each other either by using a bracket to displace the flash or by using an external remote lighting system.

With the advance of image processing technologies, it is now possible to digitize an image and store the digitized image in a computer system. This is typically done either using a digital camera to capture the image digitally, or using a scanner that converts the image into digital form. The digital image includes data representing image pixels arranged in a grid format. The data of the digital image are then stored in the computer. The digital image can be retrieved for display and can also be digitally altered in the computer. Note that almost all modern photographic printing machines, including those that are based on traditional negative to silver-halide paper, or otherwise termed analog printing, now digitize an image prior to printing. As red-eye defects are the most common picture defect in consumer photography it is important for photofinishers to make corrections automatically to pictures prior to printing. Further, given the volumes of pictures processed by large photofinishers it is very important that any means for correcting red-eye defects is both fast and accurate.

In addition to storing images on a desktop computer, many users are now looking for alternative means to use and share digital images with friends and family. This may involve sending pictures by e-mail or carrying or these digital assets on removable media or on a hand-held PDA or state-of-art mobile phone. Again, it is of increasing importance for many consumers to have an automatic means of correcting red-eye defects without having to load their pictures onto a desktop computer. Such means must be efficient in terms of computing resources and must still be fast enough on low-end embedded appliances to be practically unnoticeable to an end user.

Several prior art techniques have been proposed to reduce the red-eye effect. A common prior art approach, in the pre-capture stage, is to use multiple flashes in the camera to contract the pupils before a final flash is used to expose and capture the image. However, disadvantages are associated with this prior art approach. Physiologically, the response time to the detection of bright light, in the parasympathic pathways in the pupillary light reflex which provides the command and response of the iris sphincter muscle can take up to a full second before the eye constricts to a daylight pupil size. Therefore, the one disadvantage is the delay between the time when the first flashlight appears and the time when the picture is actually taken. This means the picture is taken at least one second after the exposure button has been pressed. This Eliminates the notion of a decisive moment as detected by the photographer. The subjects may move away from the posed positions before the image is captured. In addition, this technique is inefficient energy wise, with the need for multiple flashes for a single image. It also creates much attention to the photographer, and the photographic process will no longer have any element of surprise to it. Further, this prior art approach cannot solve the red-eye problem in photographs that have already been taken.

A good example of a recent prior art in this field is U.S. Pat. No. 6,134,339 to Luo. Because images can now be captured as or converted into digital images, it is thus possible to correct the red-eye problem in an image digitally. Some prior art schemes have been proposed to correct the red-eye problem digitally.

One such prior art approach as cited in U.S. Pat. No. 6,278,491 to Wang et. al., which is well known to those skilled in the art requires the user to precisely locate the center of a pupil so that a black circle is placed over the red-eye region. One disadvantage is that it cannot automatically detect the red eyes, but rather requires the user intervention to precisely locate the positions of the red pupils. Another disadvantage of this prior art approach is that the red-eye region is often not a circular region. This may cause portions of the red-eye region not to be covered by the black circle. In addition, the black circle may not be able to cover the peripheral area such as the pink ring of the red-eye region. Several related prior art techniques which require user intervention to locate the region of an image where a red-eye defect is located are described by U.S. Pat. No. 6,009,209 to Acker, Bien and Lawton, U.S. Pat. No. 6,016,354 to Lin, et al. and U.S. Pat. No. 6,204,858 to Gupta.

Another public knowledge prior art scheme simply provides the user with means for manually painting over the red eyes digitally. The disadvantage of this prior art scheme is that some kind of painting skill is needed for the user to paint over the red eyes. Another disadvantage is that the correction of the red-eye is not done automatically, but rather manually. Moreover, replacing the red pupil with a complete black circle may also cover the glint in the pupil, which is always there in the case of a flash picture. This glint, as small as it may be, gives a very important and necessary vitality to the eyes. Thus, the result of this type of correction is often quite noticeable and undesirable, and sometimes destroys the natural appearance of the eyes in the image.

Several recent patents such as U.S. Pat. No. 6,009,209 to Acker, Bien and Lawton and U.S. Pat. No. 6,204,858 B1 to Gupta have sought to improve on the manual correction of eye defects by adding semi-automated mechanisms to analyze the areas around an eye and simulate the colors, regional transitions and "glint" of the eye. However these techniques are dependent of the eye region being large enough to partition into a number of distinct regions and will only work in a subset of cases. Further, they requite the user to manually select a region around the eye.

Another prior art patent U.S. Pat. No. 5,432,863 to Benati, Gray and Cosgrove describes a user-interactive method for the detection of objects in an image that have the color characteristics of red-eye. This method automatically detects candidate red-eye pixels based on shape, coloration and brightness. However it should be understood that there could be many features in an image, which may be mistaken for red-eye defects. For example, red Christmas tree decorations, cherries or other fruit, clothing with bright red patterns, and so on. Thus prior art methods such as this required user interaction to verify a defect before it could be corrected.

More recently U.S. Pat. No. 6,252,976 to Schildkraut and Gray and U.S. Pat. No. 6,278,491 to Wang and Zhang describe several approaches eliminating user intervention and detecting red-eye defects in a completely automatic manner. These techniques share a common approach of firstly detecting the face regions of persons in a digital image, secondly detecting the eye region in each face and finally determining if red-eye defects exist in the subject's eyes. Both patents adopt quite complex, and thus resource intensive, image processing techniques to detect face and eye regions in an image and subsequently verify the presence of red-eye defects. Further, there are some disadvantages to this approach when two, or more, facial regions overlap or are in close proximity to one another, particularly when a technique is weighted heavily to detect balanced eye-pairs.

In addition to the aforementioned disadvantages, U.S. Pat. No. 6,252,976 to Schildkraut and Gray employ a complex procedure to detect faces and balanced eye-pairs from a skin-map of the image. This task requires several partitioning and re-scaling operations. Significant additional processing of a potential face region of the image then follows in order to determine if a matching pair of eyes is present. Finally, the image pixels in the detected eye regions go through a complex scoring process to determine if a red-eye defect is present. Further, this prior art patent does not propose a means of correcting a red-eye defect after it is detected.

U.S. Pat. No. 6,278,491 to Wang and Zhang makes extensive use of neural network technology in the detection algorithms. Such techniques are well known and are optimized for implementation as a dedicated hardware solution, e.g. as a dedicated ASIC (application specific integrated circuit). Typically, the implementation of a neural network on a conventional computer will require significant memory and computing power. In addition, this patent requires multiple re-scaling and rotations of the original digital images, both tasks increasing significantly the requirements for both computing power and memory storage. Further, Wang and Zhang do not propose a detailed technique for correcting any red-eye defects but only suggest replacing the color of an identified defect pixel with a predetermined color. This step, in turn, suggests that user intervention will be required in any practical embodiment of the invention described in this patent.

Given the above considerations there is need and scope for significant improvements in the automation of both the detection and the correction of red-eye defects in digital images. In particular, there is an obvious need to find a solution that does not require the detailed and recursive processing steps described in these patents in order to detect and locate with a very high degree of probability red-eye defects in a digital image. This is particularly the case for applications where large batches of images must be constantly processed in real time, or in handheld digital appliances such as personal digital assistants or mobile phones where real-time processing of an image must be achieved with limited computing resources.

SUMMARY OF THE INVENTION

The objective of the present invention is to provide an improved means of detecting red-eye defects in digital images thereby reducing or eliminating the need for human intervention Another objective of this invention is to provide means of correcting such defects to restore the natural color of the eye without requiring human intervention.

A further objective of the present invention is to provide a means for detecting and correcting red-eye defects in digital images, in real time in a digital camera prior to saving the images on in the camera memory.

Yet a further objective of the present invention is to provide a means for activating the needed detection inside digital camera as part of the acquisition process with a trigger that relates to the camera operation such as the existence of flash and the distance of the subject photographed.

An additional objective of the present invention is to provide a means for detecting and correcting red-eye defects in digital images prior to display on a personal digital assistant (PDA), mobile phone, digital camera or similar hand-held digital appliance.

Another objective of the invention is to provide a means of detecting and correcting red-eye defects in large batches of digital images in real-time by implementing a computationally efficient method of performing the above tasks.

The present invention describes an improved means for (i) detecting and (ii) correcting the red-eye defect in a digital image. The detection step comprises the main sub-steps of (a) converting the image into Lab color space; (b) identifying and labeling the potential red-eye segments in the image using a single raster-scan of the image; (c) rejecting potential red-eye segments which have a shape, size, compactness or contrast ratio which are incompatible with a red-eye defect or that are not adjacent to skin patches. Any remaining segments have a very high probability to be red-eye defects and are passed for correction. The correction step comprises the main sub-steps of (a) calculating the histogram of the a component of a segment and its bounding region; (b)

calculating the 70% value of the a component in this region; (c) pixels with a value of a greater than this 70% value are truncated to the 70% value; (d) the corrected image is converted from Lab color space back to the original image format.

An advantage of the present invention is to provide a means of correcting red-eye defects which operates uniformly on both pixels which are members of a defect and its bounding region thus avoiding the need to determine individually if pixels in the neighborhood of said defect are members of the defect and to subsequently apply correcting algorithms to such pixels on an individual basis.

An additional advantage in this context is that color artifacts due to the misclassification of the membership of pixels in a defect are avoided, which means that the process of correcting the red eye also acts as a buffer for potential misdetection of pixels.

An advantage of the present invention is that it provides an accurate and automated method of detecting red-eye artifacts in photographs.

A further advantage of the present invention is that it automatically corrects any red-eye defects without requiring human intervention.

Yet another advantage of this invention is that it describes a method of correcting and restoring red eye images to their natural color.

An advantage of the present invention is that it reduces the requirement for recursive image analysis on the entire image performing segmentation and labeling operations in a single raster-scan of the entire image.

A further advantage of the present invention is that it is not limited in its detection of red-eye defects by requirements for clearly defined skin regions matching a human face.

Yet a further advantage of this invention is that it does not require matching symmetrical eye-pairs. Thus it provides for improved detection of defects when face regions are in close proximity (cheek-to-cheek) or are overlapping as may often occur in-group pictures.

A further advantage of the present invention is that it is sufficiently fast and accurate to allow individual images in a batch to be analyzed and corrected in real-time prior to printing.

Yet a further advantage of the present image is that it has a sufficiently low requirement for computing power and memory resources to allow it to be implemented inside digital cameras as part of the processing post-acquisition step.

Yet a further advantage of the present image is that it has a sufficiently low requirement for computing power and memory resources to allow it to be implemented as a computer program on a hand-held personal digital assistant (PDA), mobile phone or other digital appliance suitable for picture display.

An additional advantage in this context is that the invention is sufficiently fast to allow automatic correction of images prior to display especially for appliances that do not provide a screen pointer to allow the selection of a red-eye region for correction.

Yet a further advantage of the present invention is that the red-eye detection and correction process in a digital camera can be activated only when needed based on the acquisition information.

BRIEF DESCRIPTION OF THE DRAWINGS

FIG. 4 is a diagrammatic representation of a potential red-eye segment and its bounding region;

DETAILED DESCRIPTION OF THE INVENTION

Figure 1:
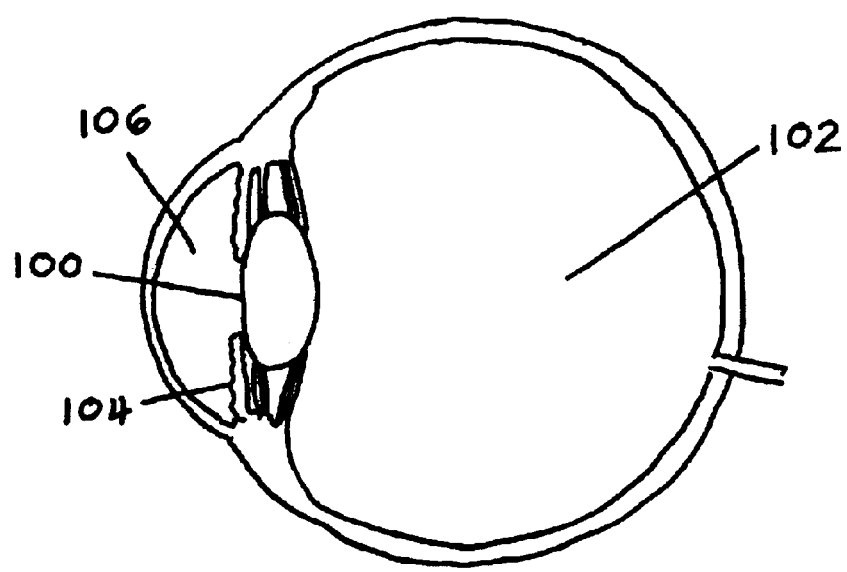
FIG. 1 illustrates the structure of the human eye with a view to explaining the origin of the red-eye phenomenon in photography.

Briefly, the present invention includes a method and apparatus to (i) detect red-eye defects in a digital image without requiring user intervention and (ii) correct these defects by restoring the original eye color without requiring user intervention.

The detection step comprises the following main sub-steps: (a) the image is converted into Lab color space, whereas an Lab color space, also denoted by L*a*b* in technical publications is a well defined close to uniform Luminance chrominance color space, whereas the "L" axis denotes luminance, the "a" axis denotes red-green colors and the "b" axis denotes the blue-yellow data; (b) the image is segmented and red pixels with the correct luminosity to match red-eye defects are labeled; (c) connected segments are labeled in a single raster-scan of the image; (d) segments with inappropriate areas (too large or too small) are rejected; (e) elongated segments are rejected; (f) non-compact segments are eliminated; (g) segments which are not located in the vicinity of skin patches are eliminated; (h) segments with low contrast are eliminated. At the end of this elimination process any remaining red segments in the image have a very high probability of being red-eye defects.

The correction step comprises the following main steps: (a) a bounding box is defined around the segment and the histogram of the "a" component (the red-green axis one of the 3 color components in Lab space) for this box is computed; (b) the 70% value of the "a" component is calculated; (c) pixels with a value of the "a" component greater that the 70% value are limited to that value; (d) the corrected image is now converted back from Lab color space into its original color space or file format. By limiting the "a" component to its 70% value we reduce the red components but retain the other fundamental color components of the eye. Thus, in most instances, the red-eye defect is not only removed, but in fact the eye color is corrected to a color very close to its natural appearance.

In order to identify red eye areas in the image, specific characteristics must be extracted. Red eyes are image areas characterized by:

a reddish tone;

a round shape;

an area that is relatively small with respect to the whole image area;

compactness, i.e., they do not contain large holes;

they are located in the neighborhood of skin patches;

Red-eye segments may additionally be characterized by:

the presence of whitish pixels, associated with the sclera of the eye around the cornea, in close proximity to the segment the existence of a relatively high local variation in contrast across the segment the existence of a distinctive step increase in the local histogram of the red-color component of the image.

In the following description of a preferred embodiment of the present invention it is assumed that the invention is implemented as a computer program on a standard desktop PC. However, as will be apparent to those skilled in the art, the same invention could equally well be implemented as a client-server application to operate over a networked computer environment, or as an electronic sub-system in a dedicated photo-finishing apparatus. Similarly, we will assume that the digital image is available on the hard disk of the desktop computer in a common file format known as RGB bitmap. However it will be apparent to those skilled in the art that the image data may equally well be stored on some removable digital media such as CD or compact flash memory card, or located on a remote computer or data store and available to the desktop computer over a computer network. It will also be apparent that the image may be stored in a multitude of differing digital data formats.

The present invention can be separated into two main functional steps. The first step is the process of detecting and labeling any potential red-eye segments in a digital image. The second step is the process of correcting the color of any such segments to remove the excessive redness while preserving the original color of the eye segment.

Figure 2A:
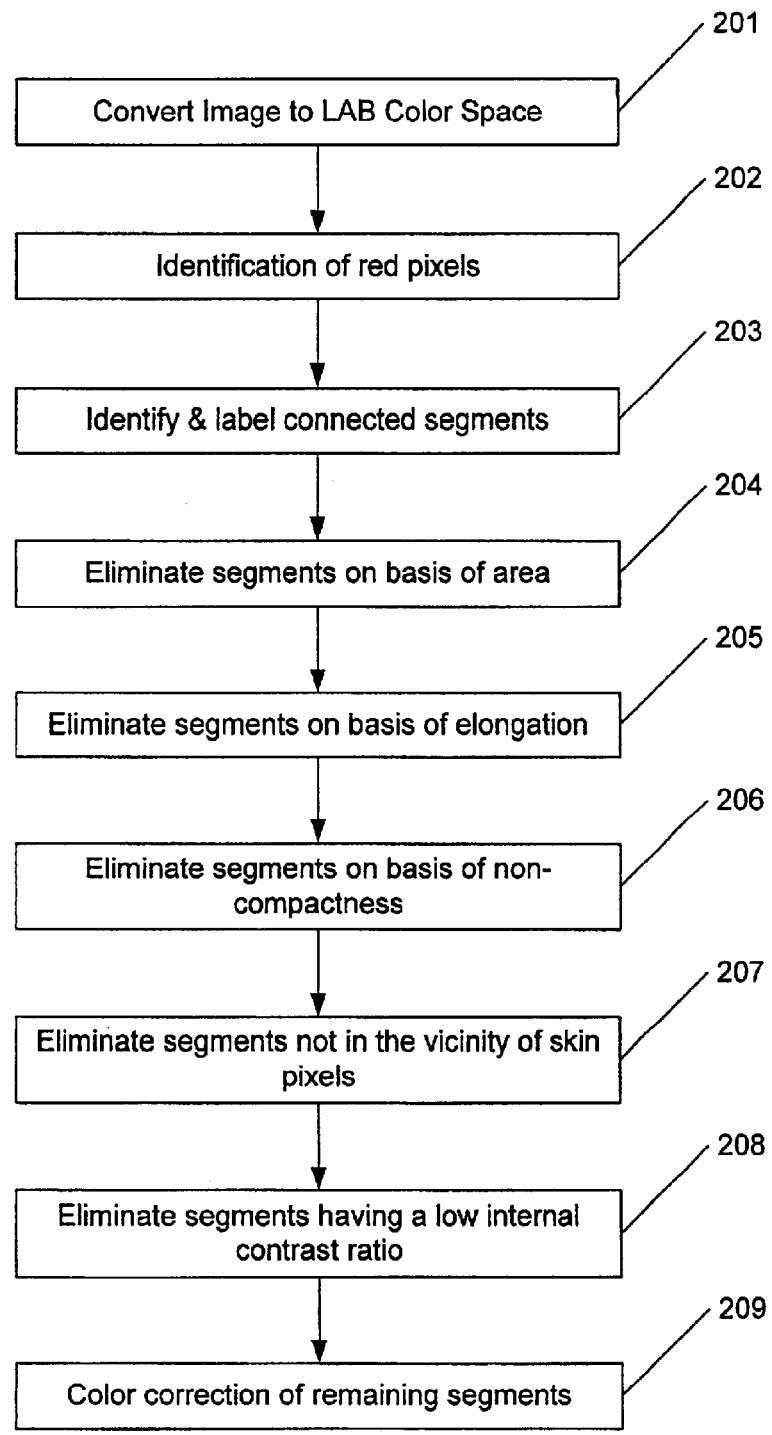
FIG. 2(a) is a flowchart illustrating the main steps of the detection phase of this invention during which red-eye segments are discovered in the image without user intervention.
Figure 5:
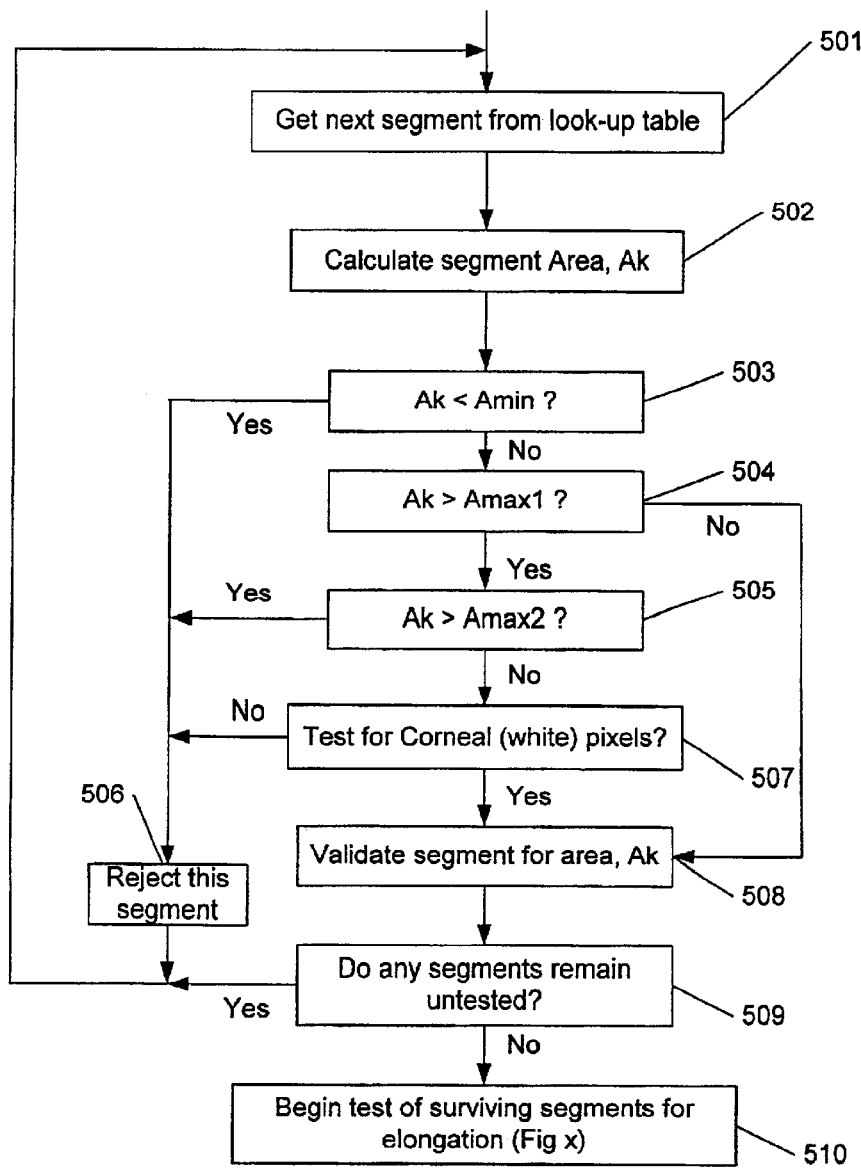
FIG. 5 illustrates the process of eliminating potential red-eye defects on the basis of their size.
Figure 6:
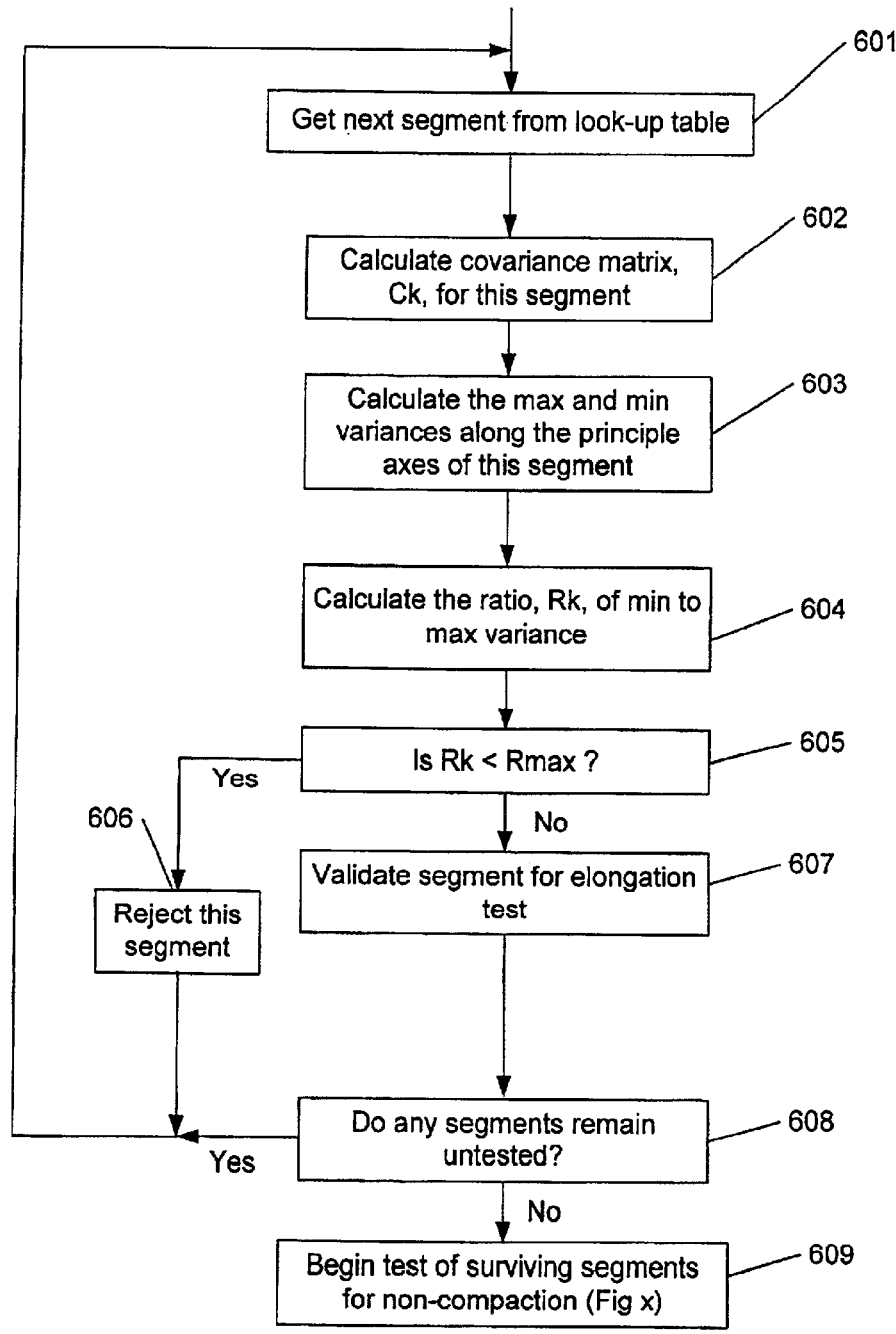
FIG. 6 illustrates the process of eliminating potential red-eye defects on the basis of excessive segment elongation.
Figure 7:
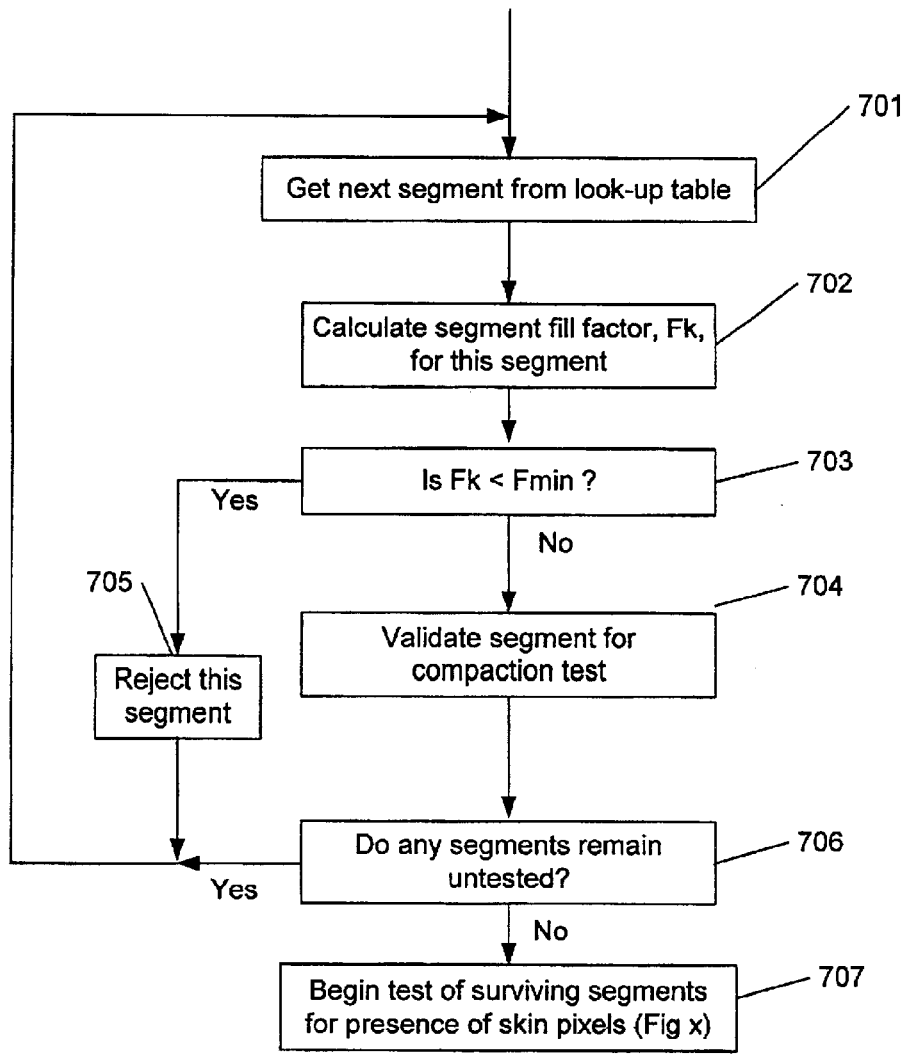
FIG. 7 illustrates the process of eliminating potential red-eye defects on the basis of non-compactness.
Figure 8:
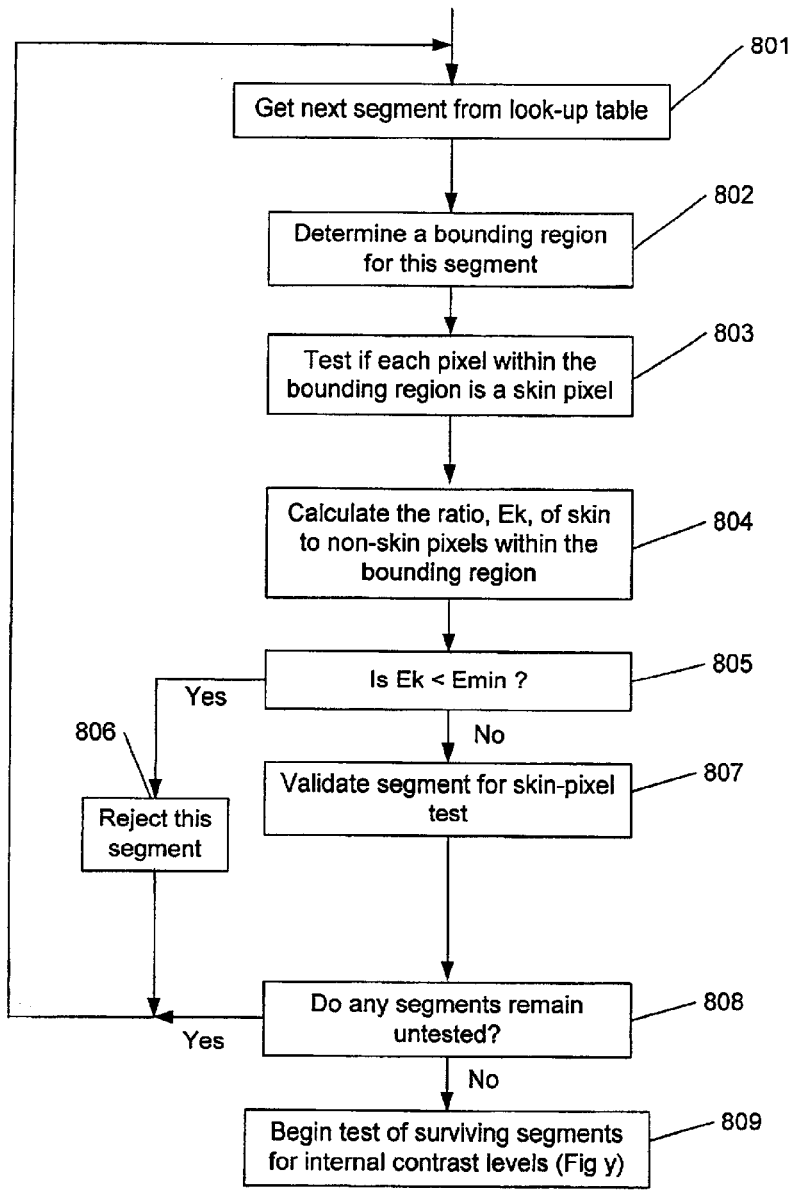
FIG. 8 illustrates the process of eliminating potential red-eye defects that do not lie in a region where a sufficient density of skin pixels are present.
Figure 9:
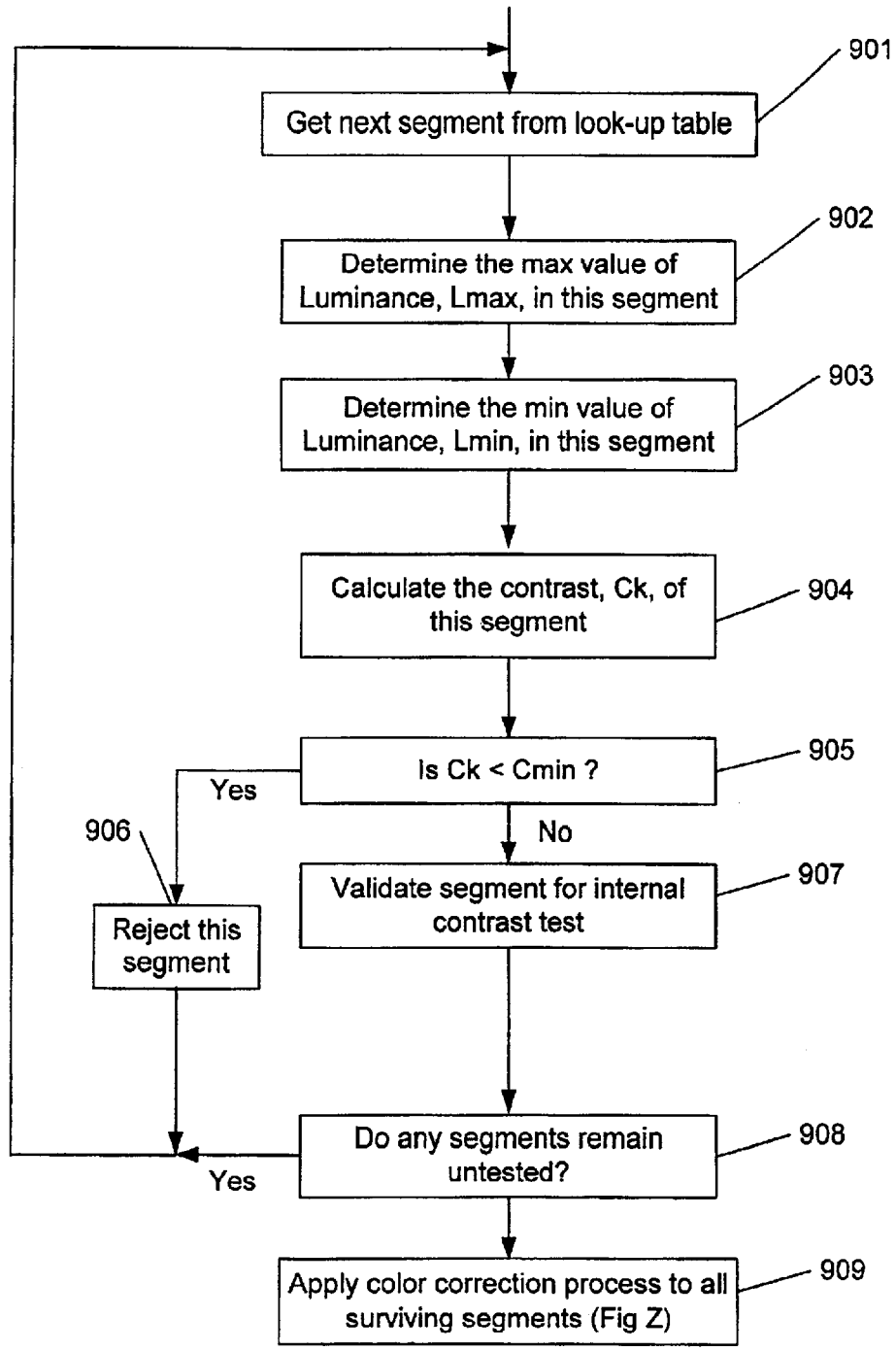
FIG. 9 illustrates the process of eliminating potential red-eye defects that do not have a sufficiently high internal contrast level.

FIG. 2(a) describes the first of these steps. Each step described in the FIG. 2(a) overview of the detection process is further expanded in the following figures. Thus FIG. 3(a) and 3(b) describe step 203 in greater detail; FIG. 5 describes step 204; FIG. 6 describes step 205; FIG. 7 describes step 206; FIG. 8 describes step 207; and FIG. 9 describes step 208. Finally step 209, being the second step, or correction process of the invention is described in more detail in FIG. 2(b).

Returning to FIG. 2(a) we now continue with our description of the detection process. The image to be processed is assumed to be available in a standard file format such as JPEG, TIFF or RGB bitmap. To facilitate the subsequent image processing algorithms that are applied to the image it is firstly converted into the Lab color space 201. This color space stores the data for each pixel in the image as a triplet of values, the luminance "L", and the "a" and "b" chrominance components. This color space will be well known to those familiar in the art of image processing, however a short explanation is included to facilitate the remainder of this description. The luminance component "L", is a measure of the brightness of an image pixel, the "a" component measures the red/green color of a pixel and the "b" component measures its yellow/blue color.

As most images must be converted to RGB in order to display the image on a computer monitor our preferred embodiment makes a conversion of an RGB image into Lab color space, using look-up tables in order to speed-up the algorithm. It is assumed that images in other formats such as JPEG or TIFF have been de-compressed or converted into RGB prior to this step. The conversion of image data between different file formats is well known to those skilled in the art.

From this point on, a color pixel f(i,j) will be identified by a color triple, [L(i,j), a(i,j), b(i,j)] where i,j are the horizontal and vertical co-ordinates of the pixel in the image and "L" represents the luminosity component. The larger the "L" value, the brighter the respective color. The "a" and "b" values represent the color components which are independent of "L", i.e., they define the color tone of a pixel. The "a" axis goes from green to red tones: large negative values of "a" indicate greenish colors, which turn reddish as "a" increases. The "b" axis goes from yellow to blue.

The next step is to categorize pixels as being red enough to be members of a potential red-eye segment 202. This is easily achieved by setting a threshold on the "a" and "L" components of a pixel. Thus if the conditions "a">"$a_{RED}$" and "L">"$L_{RED}$" are met, then a pixel is sufficiently red to be a potential member of a potential red-eye segment. We have found useful values of "$a_{RED}$" and "$L_{RED}$" to be +17 and +40 respectively. Note that the "a" component covers values from −500 up to +500. Negative values indicate green tones while positive values indicate red tones. The value of +17 for the threshold was heuristically determined such that no red eyes in the test database are missed. The additional luminosity constraint used in the decision step is useful in order to avoid dark pixels, the color of which is barely perceivable by the human eye, to be labeled as "red".

Now it is necessary to group these "red" pixels into connected segments 203. Identification of connected segments in the binary image is achieved by applying a standard labeling algorithm that works in a single raster-scan of the image using a label correspondence look-up table. Labeling is a well-known technique in image processing. All techniques described in textbooks are 100% accurate, the choice between then being made with respect to other criteria, mainly the processing time.

Figure 3A:
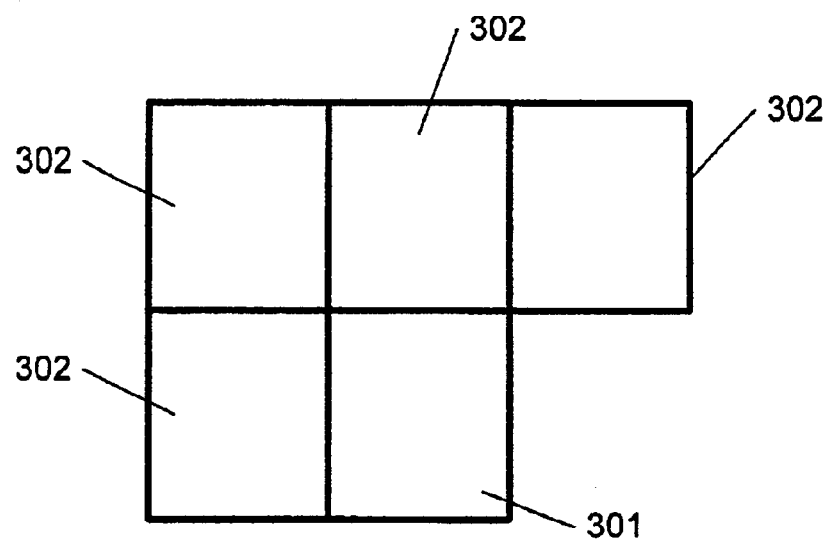
FIG. 3(a) is a diagrammatic representation of the current pixel and the 4-neighbourhood pixels used by the labeling algorithm.
Figure 3B:
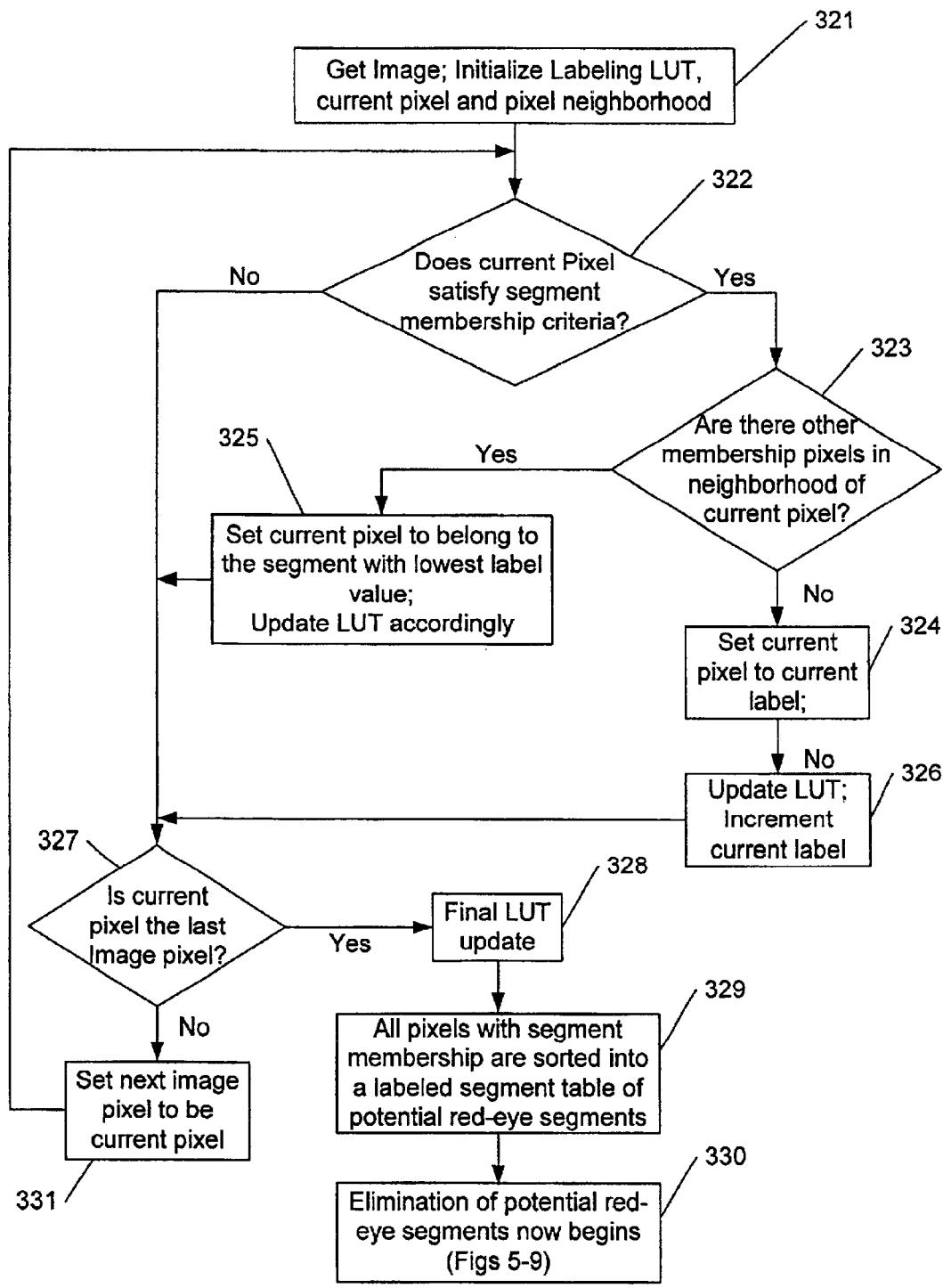
FIG. 3(b) is a flowchart describing the implementation of a single-pass labeling algorithm used in the preferred embodiment to discover and mark potential red-eye segments.

In order to expand our description of step 203 we must now refer to the detailed flowchart of the algorithm used in our preferred embodiment given in FIG. 3(b). A description of this algorithm is now given, although, as will be understood by those skilled in the art, there are many similar algorithms that may be used to achieve the same goal of labeling all connected segments in an image. Thus it is to be understood that the following description is not intended to limit the scope of the present invention being one of many labeling algorithms that are well known to those skilled in the art.

FIG. 3(a) shows a diagrammatic representation of a neighborhood with four pixels 302, containing three upper pixels and a pixel to the left of the current pixel 301. This 4-pixel neighborhood is used in the labeling algorithm as implemented in the preferred embodiment. A look-up table, LUT, is defined to hold correspondence labels. The labeling algorithm as described in FIG. 3(b) begins by loading the image, initializing the LUT and the current pixel pointer 321. It then begins recursive iteration through all the pixels of an image. The image is raster-scanned from top-left to bottom-right. If a pixel satisfies membership criteria for a segment 322, i.e., if it is sufficiently "red", then the algorithm checks for other "red" pixels in the 4-pixel neighborhood 323. If there are no other "red" pixels, then the current pixel is assigned membership of the current label 324. The LUT is then updated and the current label value is incremented 326. If there are other "red" pixels in the 4-pixel neighborhood then the current pixel is given membership in the segment with the lowest label value and the LUT is updated accordingly 325. After the current pixel has been labeled as part of a "red" segment 324 or 325, or has been categorized as "non-red" during step 322, a test is then performed to determine if it is the last pixel in the image 327. If the current pixel is the last pixel in the image then a final update of the LUT is performed 328. Otherwise the next image pixel is obtained by incrementing the current pixel pointer 331 and returning to step 322 and is processed in the same manner 322–327. Once the final image pixel is processed and the final LUT completed 328, all of the pixels with segment membership are sorted into a labeled-segment table of potential red-eye segments 329. We may now proceed to begin eliminating these potential red-eye segments based on a range of segment attributes 330.

A representation of a typical segment is given in FIG. 4 and is comprised of three regions: there are "red" pixels, $p_{red}$ 401 which are contiguous and delimit the extremities of the segment; there are "non-red" pixels, $p_{norm}$ 402 and the entire segment is surrounded by a "bounding" region 403 which is useful in performing several of the subsequent image processing steps we describe in this preferred embodiment. Note that this diagram is for descriptive purposes only and the sizes of both the actual segment and the "bounding" region are typically somewhat larger than are shown here.

Note that the processing time requested by a labeling algorithm actually depends upon the number of distinct segments present in the binary image being labeled. The algorithm described in this preferred embodiment is the fastest on average. It completes the labeling of all segments within a single raster scan of the image, by using a label correspondence LUT.

At this point we have a set of potential red-eye segments for the image however, as will be apparent to those skilled in the art, most of the segments identified in this initial stage of the detection process will not be due to red-eye defects. The next stage of our detection process is to eliminate those segments that do not satisfy a range of other characteristics and criteria normally associated with a segment that is a valid red-eye defect. We now present a description of the elimination process covering a range of 5 key criteria and described in FIGS. 5–9 and corresponding to steps 204–208 in FIG. 2(a). Note that, although the 5 main criteria presented in this description of the preferred embodiment are quite comprehensive, it is not the intention to limit the scope of the invention solely to these particular criteria. As will be understood by those skilled in the art, additional filtering criteria may provide improved results in certain particular instances. Thus other embodiments of the present invention may incorporate refinements on the criteria described below or additional filtering criteria not described in the present preferred embodiment.

The first criteria we apply is to eliminate segments of an inappropriate size for a red-eye segment, i.e., segments that are too small, or too large. This elimination step corresponds to step 204 in FIG. 2(a) and is described in detail by FIG. 5. We begin this step by getting a list of pixels, described by their i,j co-ordinates, that are members of a particular segment 501. The segment area is determined by obtaining the maximum and minimum i (vertical) and j (horizontal) co-ordinates of its member pixels—this can be better understood by referring to the representation of a typical segment, $S_k$, in FIG. 4. The area of the segment is then calculated as $A_k = \Sigma p_{RED}$, or in words the effective area of the potential red-eye segment is the sum of the confirmed "red" pixels (i.e. $p_{RED}$) in that segment 502.

Only segments $S_k$ with the area $A_k$ between given limits $A_{MAX} \geq A_k \geq A_{MIN}$ are further inspected. Now red-eye defect segments can be quite small, but it is generally unproductive to process segments below a certain minimum number of "red" pixels as such defects are not particularly noticeable and do not have sufficient detail to benefit from additional processing. For a standard digital image a suitable lower threshold for the area, $A_{MIN}$, is of the order of 20–50 pixels. Thus any segments of a size less than $A_{MIN}$ 503 are immediately eliminated from the LUT 506. Experiments have led to the conclusion that the area occupied by the red pupil of an eye is normally less than 0.1% of the total area of a standard photograph. This sets the threshold for the first upper limit on segment area, $A_{MAX1}$ 504. Any segments that survived elimination at steps 503 and 504 are next marked as valid red-eye segments 508 on the basis of segment size. However, in certain instances, for example close-up portraits, the upper size limit may be as large as 0.5% of the total area, but the red pupil should now have a distinct surrounding region of whitish color, being the cornea of the eye. Thus any segments that failed the size test under 504 are given a second size test and if $A_k = A_{MAX2}$ 505 then the "bounding" region of the segment is tested for the presence of any whitish pixels 507. If there are sufficient whitish pixels the segment is validated on the basis of segment size 508, otherwise the segment is rejected 506 and the next potential red-eye segment is loaded from the LUT. Any red segments of an area greater than $A_{MAX2}$ are unlikely to be due to red-eye defects and can be discarded 506. Finally when there are no more potential red-eye segments left in the LUT 509 testing can begin on the remaining valid segments in order to eliminate segments that are too elongated to be valid red-eye segments 510.

Elimination of elongated segments (FIG. 2(a) step 205) is described in detail by the flowchart in FIG. 6. For each segment $S_k$, the variances $\lambda_{k_{MAX}}$ and $\lambda_{k_{MIN}}$ along the principal axes are computed. We note that the variance $\lambda$ of a set of 1-D (one dimensional) samples $x_i$ with $i \in [1 \ldots N]$ is computed according with the formula $$\lambda = \frac{1}{N}\sqrt{\sum_{i=1}^{N}(x_i - \bar{x})^2}$$

where $$\bar{x} = \frac{1}{N}\sum_{i=1}^{N} x_i$$

is the mean. These variances, $\lambda_{k_{MIN}}$ and $\lambda_{k_{MAX}}$ are obtained from the eigenvalues of the covariance matrix Ck given by the matrix formula (i,j are the horizontal and vertical co-ordinates of a pixel in the image, said pixel being a member of segment Sk, the $k^{th}$ segment remaining in the LUT of potential red-eye segments):

$$C_k = \frac{1}{A_k} \sum_{i,j \in S_k} [ij]^T \cdot [ij] - [\overline{ij}]^T \cdot [\overline{ij}]$$

where T denotes the matrix transpose operator, and:

$$\overline{i} = \frac{1}{A_k} \sum_{(i,j) \in S_k} i; \quad \overline{j} = \frac{1}{A_k} \sum_{(i,j) \in S_k} j$$

The test process is as follows: the next surviving potential red-eye segment is loaded 601 and the covariance matrix, Ck, for this segment is calculated 602. The maximum and minimum variances along the principle axes of this segment are next calculated from the eigenvalues of Ck 603, a procedure well known to those skilled in the art. The aspect ratio $R_k$ of segment Sk is then computed as 604:

$$R_k = \frac{\lambda_{k_{MIN}}}{\lambda_{k_{MAX}}}$$

Segments that are too elongated 605 to be red-eye defects, i.e., segments with $$R_k \leq R_{MAX}$$

with RMAX being a pre-defined threshold, are exempted from further processing 606, as they are unlikely to represent red eyes. Non-elongated shapes have the ratio Rk close to unity. A useful criteria for segments with Ak=AMAX1 is to eliminate all segments having Rk<0.2. For larger segments, those having area $A_{MAX1} = A_k = A_{MAX2}$, the criteria Rk<0.5 is used to eliminate potential red-eye candidates.

The remaining segments that are sufficiently rounded are marked as valid for the elongation criteria 607 and are retained for the next stage of testing. When all surviving segments have been tested 608 then testing of all surviving segments for non-compactness will commence 609.

The elimination process for non-compact segments 206 is described in detail by FIG. 7. Firstly a surviving segment is loaded into memory from the LUT 701. The segment fill factor $F_k$ is computed as 702:

$$F_k = \frac{A_k}{(i_{k_{MAX}} - i_{k_{MIN}})(j_{k_{MAX}} - j_{k_{MIN}})}$$

where $i_{k_{MAX}}, i_{k_{MIN}}, j_{k_{MAX}}$ and $j_{k_{MIN}}$ represent the minimum and maximum coordinates of pixels within the segment $S_k$. All segments with $F_k \leq F_{MIN}$ are eliminated 703, 705. In practice we have found that ratio of the segment area to minimal bounding box area, must be higher than 0.5 for a segment to be sufficiently compact to be a potential red-eye defect. Segments that pass this test for compactness are marked as such 704 and retained. When all remaining segments have been tested 706 then the next test, for the presence of skin pixels, is initiated 707.

Before describing the next elimination step, which employs a test for skin color pixels, it is useful to mention that the detection technique used in this embodiment of the present invention is the same as known techniques described in the prior-art section. This technique involves the matching of the a and b components of the Lab color value of a pixel to a set of 32 skin color prototypes while ensuring that the luminance component, L, remains greater than a lower threshold value. The skin prototypes are derived from a large database of sample images but once the 32 prototype colors are determined they remain static. In practice this technique is both fast and accurate. The technique has been documented in detail in the parent U.S. patent application Ser. No. 09/823,139.

The procedure to eliminate segments that are not located in the neighborhood of skin patches 207 is described in more detail in reference to FIG. 8 as follows: firstly a potential red-eye segment is loaded into memory 801; a bounding region delimited by corners ($i_k$[min]−d,$j_k$[min]−d) and ($i_k$[max]+d, $j_k$[max]+d), where d is a pre-defined quantity is defined around the potential red-eye segment 802; each pixel within this bounding region is now tested to determine if it is a skin pixel 803. A pixel is classified as "skin" if the minimum Euclidean distance in Lab coordinates to one of the pre-determined skin-prototypes is lower than a given threshold. This "skin pixel" decision is taken based on the use of skin prototypes as in U.S. patent application Ser. No. 09/823,139. If the skin-pixel ratio, Ek, in the bounding box is lower than a pre-defined limit, $E_{MIN}$, 804 then the segment Sk is eliminated 805, 806. Otherwise the segment Sk is validated for the skin-pixel test 807. When all surviving potential red-eye segments have been tested 808 the next test criteria for internal contrast 208 is initiated 809. This step 208 of FIG. 2(a) is described in detail by FIG. 9.

The final test step in this embodiment is the elimination of the surviving segments having low internal contrast. The contrast Ck within the a segment Sk is defined by the ratio:

$$C_k = \frac{L_{k_{MAX}} - L_{k_{MIN}}}{L_{k_{MAX}} + L_{k_{MIN}}}$$

where $L_{k_{MIN}}$ and $L_{k_{MAX}}$ are the minimum and maximum values of the luminosity, or L component within the bounding box for the segment Sk. As before one of the surviving segments is loaded from the LUT 901 and the maximum and minimum values of the luminance are calculated 902, 903 by iterating through the pixels of this segment and its bounding region. The internal contrast of the segment is then calculated 904. Only segments Sk with Ck>Cmin, where Cmin is a pre-determined limit for internal contrast in a segment, are retained 905. Segments that fail this test are eliminated 906 as potential red-eye segments. Any segments that remain after completing this final elimination test are marked as valid 907. The algorithm continues to check each segment remaining in the LUT 908 until all segments have been tested. The segments which are retained in the LUT and thus have survived all of the elimination steps 204–208 are now passed on to the color correction stage of the process 209, 909.

Figure 2B:
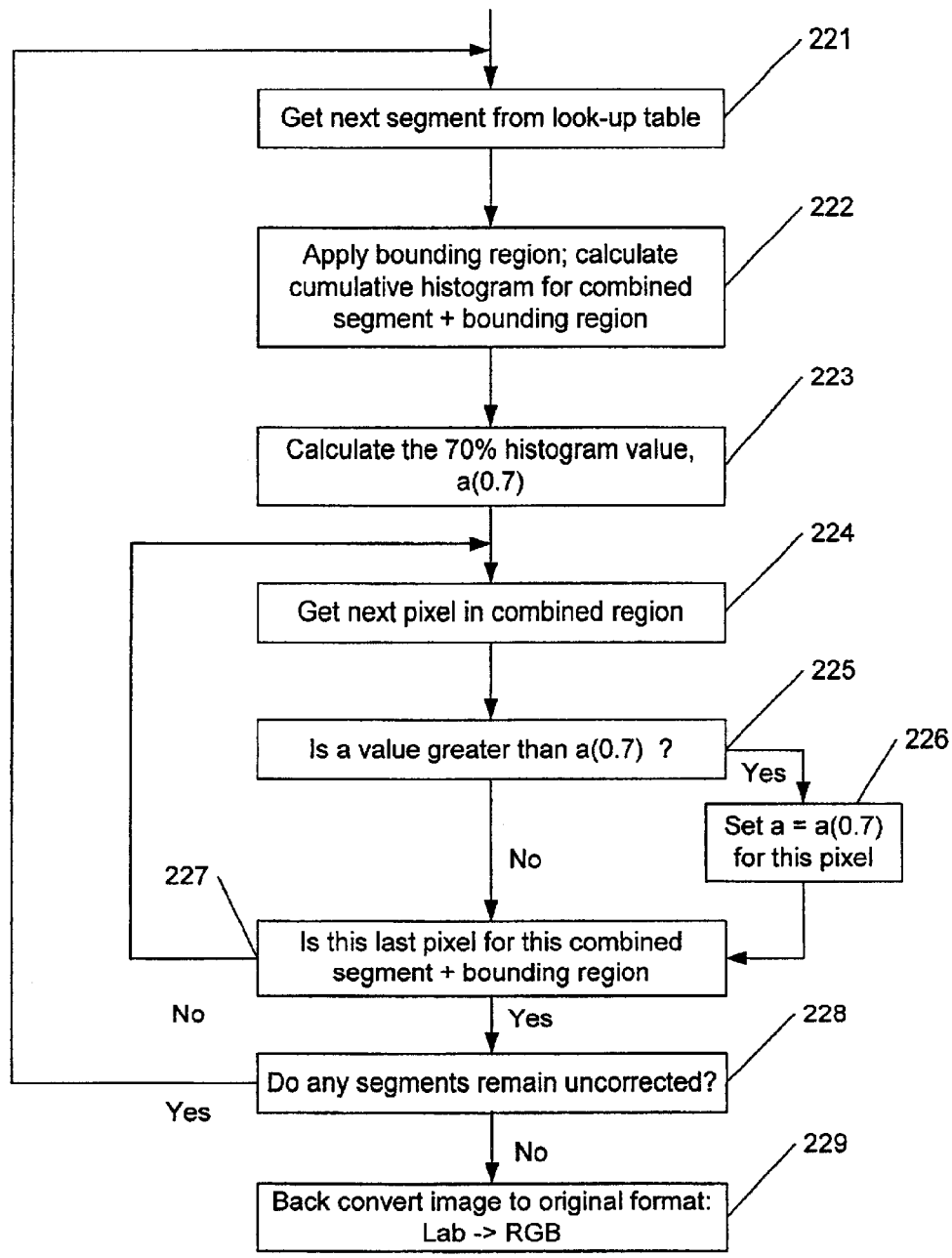
FIG. 2(b) is a flowchart illustrating the main steps in the color correction process that is applied to the red-eye segments.

The correction procedure 209, 909 for red-eye labeled segments is described in FIG. 2(b) and works as follows. Firstly, one of the surviving segments is loaded from the LUT 221 and its bounding box is defined. A typical red-eye segment 404 and its bounding box 403 is illustrated in FIG. 4. The histogram of the "a" color component, ha, is computed within the bounding box 222. Then, the cumulative histogram Ha is computed as:

$$H_a(i) = \sum_{j=a_{MIN}}^{i} h_a(j)$$

where $h_a(j)$ is the value of the histogram of the "a" color component at a particular value of "a"=j; the cumulative histogram is formed by summing from "$a_{min}$" up to the current value of "a"=i. Based on the cumulative histogram, the $a_{0.7}$ value is computed 223. The $a_{0.7}$ is the value of the "a" component which superiorly delimits 70% of the "a" histogram, i.e.:

$$H_a(a_{0.7}) = 0.7$$

Then, the "a" values of pixels within the bounding box are limited to $a_{0.7}$ 224, 225, 226:

$$a'(i,j) = a(i,j) \text{ if } a(i,j) = <a0.7;$$

$$a'(i,j) = a0.7 \text{ otherwise}$$

$$\forall (i,j) \in S_k$$

When all the pixels in a particular segment have been corrected in this manner 227 the next red-eye segment is loaded from the LUT 228 unless all segments have been corrected. The same procedure is then applied to each segment. When all red-eye segments have been corrected, the altered portions of the image are converted back to the original image format. This back translation La'b'→R'G'B' is performed for all pixels that had their a component altered by the color correction scheme 229.

Note that there are several advantages to this color correction scheme:

Firstly, by modifying the "a" components of all pixels in the bounding box, there are no artifacts due to misclassification of red pixels.

Secondly, noticeable red reduction will only be achieved if the segment's bounding box contains a reddish and a non-reddish population of pixels, i.e., the ha histogram has non-zero values in a larger interval. This is the common situation for real red-eye areas, characterized by red tones in the vicinity of the pupil and tones other than red in the remainder. In the opposite case, i.e., where there are only red pixels in the segment and the histogram is consequently very narrow, the lower and upper limits of the a component are both close to the $a_{0.7}$ value: $a_{min} \sim a_{0.7} \sim a_{max}$. In this case, the color correction to limit the redness of the area described above has practically no visible effect.

Thirdly, and in contrast to other techniques described to correct red-eye defects, our approach retains the non-red colors of the pixels. Thus in applying this technique to an image the eye defect is not only corrected but is actually restored to a color which is close to the natural coloration of the eye.

Figure 10:
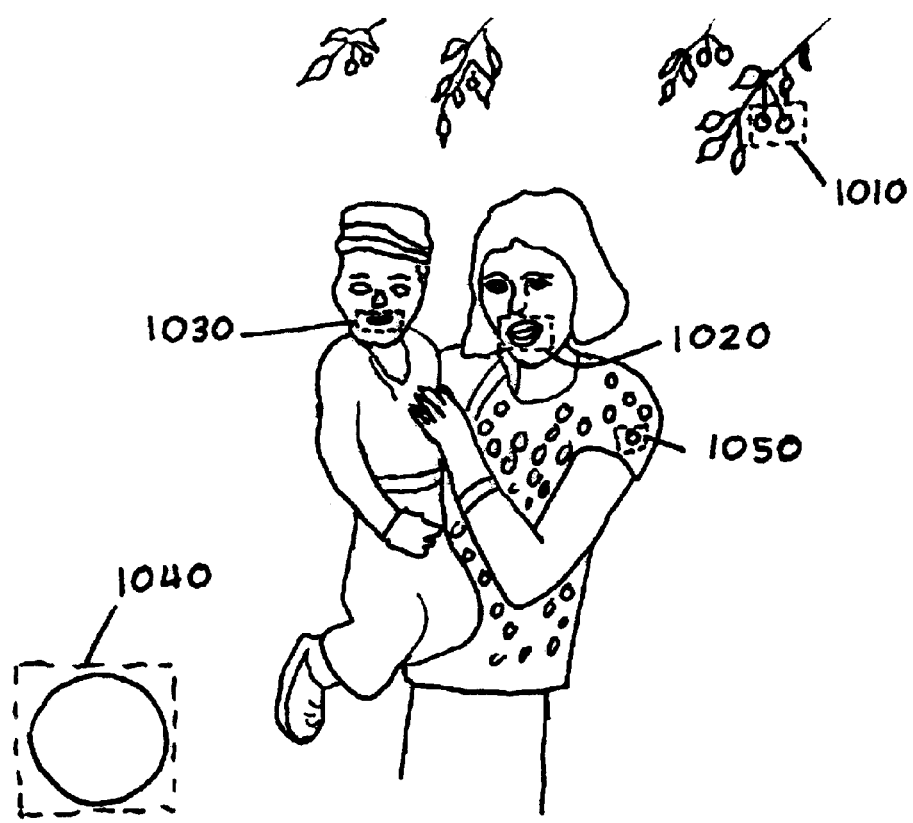
FIG. 10 illustrates a typical photographic image featuring a number of typical image components that are almost identical in shape and color to typical red-eye defects.
Figure 11A:
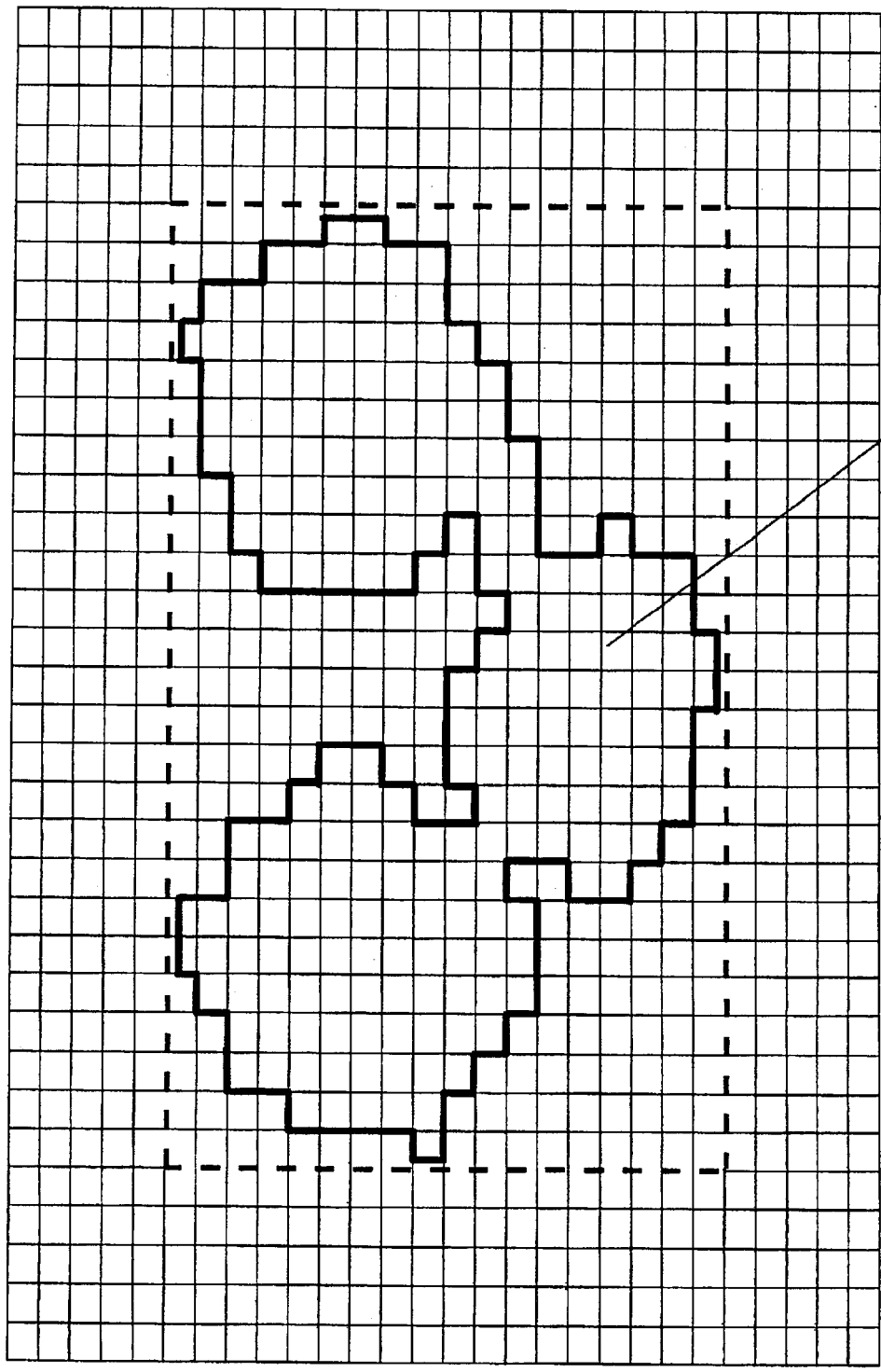
FIGS. 11(a), 11(b) and 11(c) illustrate some examples of potential red-eye segments derived from the components of the image in FIG. 10.
Figure 11B:
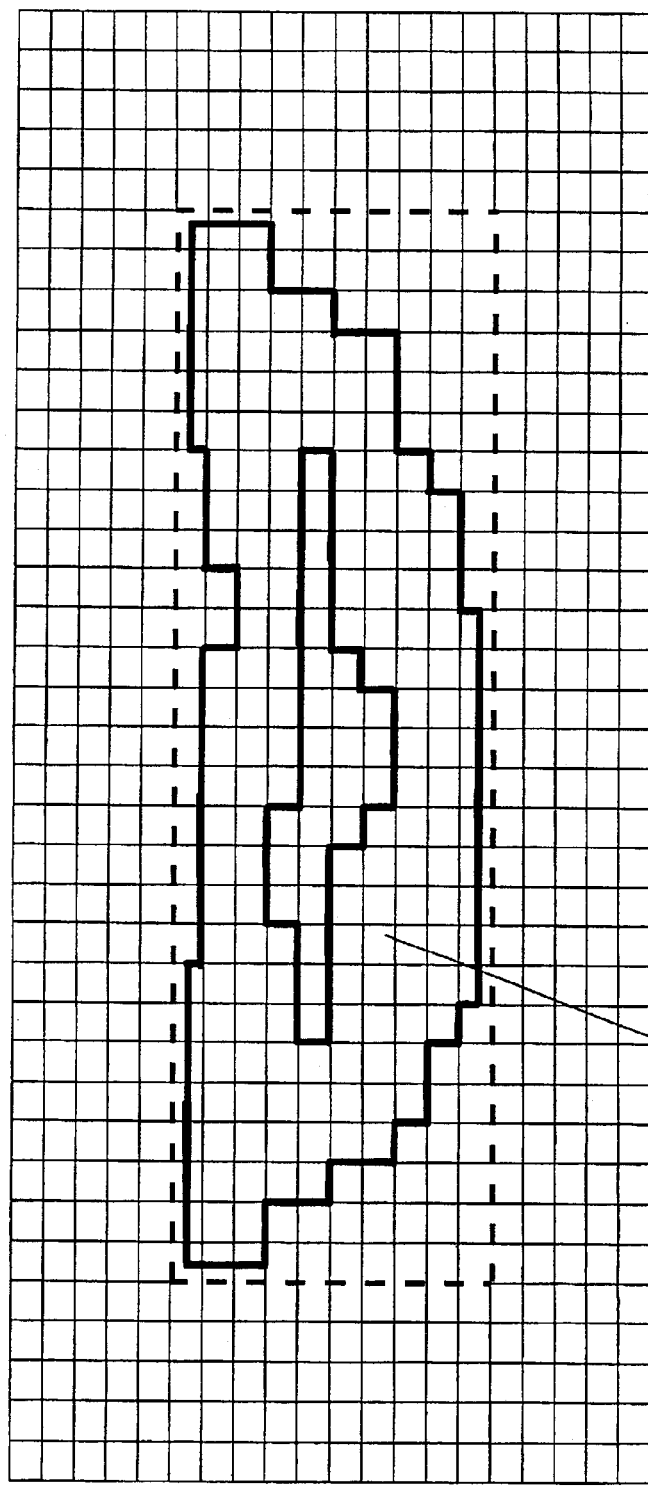
Figure 11C:
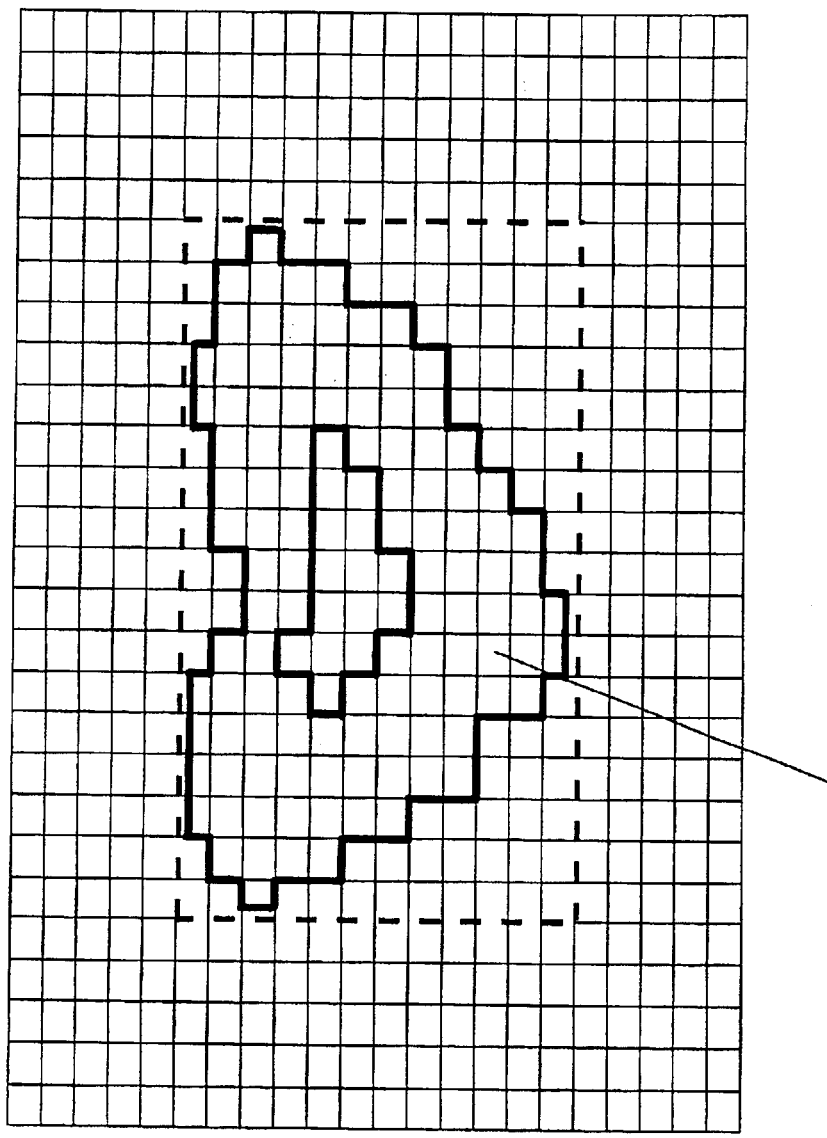

In FIG. 10 we illustrate the operation of the invention on a typical digital image. There are several components of this image which will be determined as being potential red-eye segments. For example a group of cherries, or similar fruit 1010 will produce a potential red-eye segment as shown in area 1000 of FIG. 11(*a*). However such a segment will be eliminated because of non-compactness of the segment. The mouth and lips 1020, 1030 are another component of this image, which will often be determined to be a potential red-eye segment. In most cases the mouth and lips are somewhat elongated 1020 leading to a potential red-eye segment 1002 similar to FIG. 11(*b*). In such cases the segment will be quickly eliminated due to its elongation. However in some instances, particularly in the case of children, the mouth and lip region 1030 is quite round in appearance leading to a segment of the form illustrated in area 1004 of FIG. 11(*c*). In such cases the segment will be eliminated because the internal contrast of a mouth region is significantly lower than that of an eye region. Other components of this image include a large red ball 1040, which is eliminated due to its size; and a red spotted pattern 1050 on the woman's blouse which will be eliminated due to the low internal contrast of this potential red-eye segment.

Alternative Embodiment

In an alternative embodiment, the correction scheme as defined above can be applied in conjunction with other detection algorithms as the ones defined above.

In particular, the aforementioned technology can be implemented as an interactive system whereas between the detection and correction stages, a user interaction is required to approve that the detected regions are truly red-eye ones. Such system can be utilized in production such as a custom printing, high volume printing facility or even on a digital camera. In both cases, the user may be notified of the existence of suspected red-eye regions. Such notification can be visually, by highlighting the suspected regions, or even with a unique sound or signal. The camera user, or the print operator can then decide based on the visual display of correction proposed by the system, if the correction should be applied or rejected.

In yet another alternative embodiment, in the case of using this process for digital cameras, the process will only be activated as needed. The main criteria for activating the detection is only when a flash was needed. A secondary criteria in the case that the camera has an automatic focusing mechanism is if the subject matter is close enough to the camera, for example 20 ft. or less. In this scenario an interactive stage may be added to notify the user that a red-eye artifact was detected, and the user may take action to tell the camera to apply a correction algorithm similar to the one described above, to eliminate the artifact.

Conclusion Ramifications and Scope

Accordingly, the reader can see that the above invention provides an efficient way to automatically detect and correct red-eye artifacts from digital images.

In particular, this invention has the advantages of being efficient enough in terms of computational needs to be embedded in electronic devices that require real time processing such as digital camera, hand held display devices, cellular phones etc. In addition, due to its efficiency, this invention can be implemented as part of a large volume system such as a commercial photographic printing facility.

The simple means of which the red-eye is being corrected enables a powerful solution which maintains all surrounding colors while affecting only the affected are, thus enabling a close restoration of the original scene.

Although the description above contains many specificities, these should not be construed as limiting the scope of the invention but as merely providing illustrations of some of the presently preferred embodiments of this invention. Various other embodiments and ramifications will be apparent and possible within it's scope for those skilled in the art.

It should be further understood that the programs, processes and methods described herein are not related or limited to any particular type of computer apparatus, unless indicated otherwise. Various types of general purpose or specialized computer apparatus may be used with or perform operations in accordance with the invention described herein. Further, elements of the illustrated embodiment shown in software may be implemented in hardware and vice versa.

In view of the many possible embodiments to which the principles of our invention may be applied it should be recognized that the embodiments described herein with respect to the drawings and figures is only illustrative and should not be taken as limiting the scope of the invention.

Thus the scope of the invention should be determined by the appended claims and their legal equivalents as covering all such alterations and modifications that fall within the true scope and spirit of the invention, rather than by the examples given.

What is claimed is:

1. An automated method for detecting red-eye defects in a digital image comprising:
   (a) identifying and labeling an image segment that includes a potential red-eye defect in the image based on a red chrominance component and a luminance component of a color map;
   (b) eliminating a segment as a candidate for having a red-eye defect, said eliminating including testing said segment and a boundary region of said image surrounding said segment for a plurality of attributes to determine if each said attribute exceeds a pre-determined threshold value; and
   (c) recording a location, size and member pixels of a segment that survives said eliminating and is confirmed to have a red-eye defect of said image.

2. An automated method as recited in claim 1 wherein said attributes include the area of the segment.

3. An automated method as recited in claim 1 wherein said attributes include an elongation ratio of the segment.

4. An automated method as recited in claim 1 wherein said attributes include a compaction ratio of the segment.

5. An automated method as recited in claim 1 wherein said attributes of said bounding region include a number of pixels in the bounding region of the segment matching a color of human skin.

6. An automated method as recited in claim 1 wherein said attributes of said bounding region include a number of pixels in the bounding region of the segment matching a whitish color of a corneal region of an eye.

7. An automated method as recited in claim 1 wherein said attributes of said bounding region include an internal contrast ratio of a combined segment and bounding region.

8. An automated method as recited in claim 1 wherein said threshold values include an upper threshold value and a lower threshold value and said testing threshold values is modified to allow for both said upper and lower threshold value, for allowing for both a maximum and a minimum threshold value for some of said attributes of a segment.

9. An automated method as recited in claim 1 wherein said threshold values include a plurality of upper threshold values and a plurality of lower threshold values associated with said attributes, wherein said eliminating depends on which of said thresholds is exceeded.

10. An automated method as recited in claim 9 wherein said eliminating further includes testing for an additional characteristic, said characteristic being dependent on which of said thresholds is exceeded.

11. An automated method as recited in claim 1 wherein, within a predetermined range, the value of a particular attribute of a segment may directly determine said threshold value of subsequent test attributes.

12. An automated method as in claim 1 wherein said eliminating is based on a fuzzy relationship between two or more said attributes of said segment.

13. An automated method as recited in claim 1 further comprising correcting a confirmed red-eye defect.

14. An automated method as recited in claim 13 wherein said correcting the confirmed red-eye defect includes the steps of
   (a) creating a cumulative chrominance histogram of said confirmed red-eye defect of said image;
   (b) determining a threshold value for red colors;
   (c) clipping all red components of pixels in said confirmed red-eye defect which are larger than said threshold value;
   (d) maintaining all other luminance and chrominance values of said pixels as they are thus retaining the original color of said confirmed red-eye region; and
   (e) Repeating the above steps (a)–(d) for said each defect out of said defects.

15. An automated method for detecting a red-eye defect in a digital image as recited in claim 1 wherein said method is implemented in a digital camera as part of a post acquisition process.

16. An automated method for detecting a red-eye defect in a digital image as implemented in a digital camera as part of a post acquisition process as recited in claim 15 wherein a criteria for activating the said method is acquiring said image using a flash.

17. An automated method for detecting red-eye defects in a digital image as implemented in a digital camera as part of a post acquisition process as recited in claim 15 wherein a criteria for activating said method is a distance of a subject matter to the camera when said image is acquired.

18. An automated method for detecting red-eye defects in a digital image as implemented in a digital camera as part of a post acquisition process as recited in claim 15 further comprising the steps:
   (a) notifying a user of the existence of said red-eye defects prior to saving the image; and
   (b) providing the user with a choice wherein the user can take action to correct the red-eye prior to saving the image.

19. An automated method for detecting a red-eye defect in a digital image as recited in claim 1 wherein said method is implemented in high volume photographic printing machines as part of the printing process of images.

20. An automated method for detecting red-eye defects in a digital image as implemented in a high volume photographic printing machine as part of the printing process of images as recited in claim 19 further comprising the steps:
   (a) notifying an operator of said photographic printing machine of the existence of said red-eye defects prior to printing the image; and
   (b) providing the operator with a choice wherein the operator can take action to correct the red-eye prior to printing the image.

21. An automated method of correcting red-eye defects in detected red-eye regions in a digital image for each individual defect out of said red-eye defects in said detected regions comprising:
   (a) creating a cumulative chrominance histogram of said detected red-eye region of said image;
   (b) determining a threshold value for red colors;
   (c) clipping all red components of pixels in said detected red-eye region which are larger than a threshold value; and
   (d) maintaining all other luminance and chrominance values of said pixels as they are thus retaining an original color of said detected red-eye region.

22. A user interactive red-eye detection system of digital images comprising:
   (a) apparatus for automatic detection of the existence of a red-eye region having a red-eye defect in an image including
      (i) first apparatus to segment and label a potential red-eye region in said image based on a red chrominance component and a luminance component of a color map;

(ii) second apparatus to eliminate a segment which is considered a said potential red-eye region based on testing threshold values for a range of attributes of said segment and a region of the image immediately surrounding said segment, known as a bounding region;

(iii) third apparatus to record a location, size and member pixels of a segment that is not eliminated by the second apparatus and is thus considered to be a potential red-eye region;

(b) apparatus for indicating to a user that an area of said image has been designated as a potential red-eye region;

(c) apparatus providing a user facility to choose to direct said system to correct said defect or choose to direct said system not to correct said defect;

(d) apparatus for automatic correction of said defect including (i) first apparatus for creating a cumulative chrominance histogram of said detected red-eye region of said image;

(ii) second apparatus for determining a threshold value for the red chrominance component for said red-eye region;

(iii) third apparatus for clipping all red components of pixels in said detected red-eye region which are larger than said threshold values; and (iv) fourth apparatus for maintaining all other luminance and chrominance values of said pixels of said red-eye region as they are thus retaining the original colors of said detected red-eye region.

23. A user interactive red-eye detection system as recited in claim 22 wherein said apparatus for indicating to a user that an area of said image has been designated as a potential red-eye region provides a visual highlighting of said potential red-eye region.

24. A user interactive red-eye detection system as recited in claim 22 wherein said apparatus for indicating to a user that an area of said image has been designated as a potential red-eye region provides an audible signal.

25. A user interactive red-eye detection system as recited in claim 22 wherein said user is an operator of a digital printing machine.

26. A user interactive red-eye detection system as recited in claim 22 wherein said user is an operator of a computer image editing application.

27. A user interactive red-eye detection system as recited in claim 22 wherein said user is an operator of a digital camera wherein said digital image is an image captured by said digital camera.

* * * * *

UNITED STATES PATENT AND TRADEMARK OFFICE
Certificate

Patent No. 6,873,743 B2                                   Patented: March 29, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Eran Steinberg, San Francisco, CA (US); Alexandru Drimbarean, Galway (IE); Vasile Buzuloiu, Bucuresti (RO); Mihai Alexandru Ciuc, Bucuresti (RO); Constantin Vertan, Bucuresti (RO); and Peter Corcoran, Claregalway (IE).

Signed and Sealed this Eighteenth Day of March 2008.

MR. BELLA C. MATTHEW
*Supervisory Patent Examiner*
Art Unit 2624